(12) United States Patent
Yokoi et al.

(10) Patent No.: US 7,614,277 B2
(45) Date of Patent: Nov. 10, 2009

(54) KNOCK SENSOR

(75) Inventors: Akito Yokoi, Tokyo (JP); Harumasa Shibata, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 168 days.

(21) Appl. No.: 11/360,613

(22) Filed: Feb. 24, 2006

(65) Prior Publication Data

US 2007/0113618 A1    May 24, 2007

(30) Foreign Application Priority Data

Nov. 22, 2005    (JP) .............................. 2005-336747

(51) Int. Cl.
*G01L 23/22*    (2006.01)
(52) U.S. Cl. ..................................... 73/35.01
(58) Field of Classification Search ................ 73/35.01, 73/35.09, 35.11
See application file for complete search history.

(56) References Cited

U.S. PATENT DOCUMENTS

| | | | | |
|---|---|---|---|---|
| 5,150,606 A | * | 9/1992 | Komurasaki | ............... 73/35.09 |
| 5,398,540 A | * | 3/1995 | Entenmann et al. | ......... 73/35.11 |
| 5,798,453 A | * | 8/1998 | Brammer et al. | ........... 73/35.09 |
| 5,939,616 A | * | 8/1999 | Ito et al. | ..................... 73/35.11 |
| 6,212,940 B1 | * | 4/2001 | Castaing et al. | ............. 73/35.11 |
| 6,220,078 B1 | * | 4/2001 | Brammer et al. | ........... 73/35.11 |
| 6,776,026 B1 | * | 8/2004 | Barron | ....................... 73/35.11 |
| 6,868,714 B2 | * | 3/2005 | Mueller et al. | .............. 73/35.11 |
| 7,201,038 B2 | * | 4/2007 | Kohashi et al. | ............. 73/35.11 |
| 2005/0229678 A1 | | 10/2005 | Shibata et al. | |

FOREIGN PATENT DOCUMENTS

| | | |
|---|---|---|
| DE | 100 44 483 A1 | 7/2001 |
| DE | 100 44 476 A1 | 4/2002 |
| DE | 10/2005 022 340 A1 | 4/2006 |
| JP | 2002-257624 A | 9/2002 |
| JP | 2005-308482 A | 4/2005 |

* cited by examiner

*Primary Examiner*—Hezron Williams
*Assistant Examiner*—Gunnar J Gissel
(74) *Attorney, Agent, or Firm*—Sughrue Mion PLLC

(57) ABSTRACT

A knock sensor includes: a base made up of a flange portion, and a tube portion; a sensor main body including a piezoelectric element that is fitted over an outer peripheral portion of the tube portion; and a stopper ring that is fitted over the outer peripheral portion of the tube portion and cooperates with the flange portion to clamp the sensor main body, a groove being formed on the outer peripheral surface of the tube portion, and the knock sensor being fixed by driving a pressing jig into an outer peripheral surface of the stopper ring to plastically deform the stopper ring and press a protruding portion into the groove, wherein: an axial length of a recess portion that is formed simultaneously on the outer peripheral surface of the stopper ring when the protruding portion is formed is longer than an axial length of the groove.

5 Claims, 4 Drawing Sheets

KNOCK SENSOR

BACKGROUND OF THE INVENTION

1. Field of the Invention

The present invention relates to a nonresonant knock sensor mounted to an internal combustion engine such that when a knocking vibration occurs in the internal combustion engine, the vibration is converted into a voltage signal by a piezoelectric element clamped internally, and the voltage signal is conducted out externally as an output signal.

2. Description of the Related Art

Known examples of conventional knock sensors include those in which a sensor main body including a piezoelectric element fitted over a tube portion of a base is clamped using a nut.

In such configurations, fastening of the nut is performed using a tool such as a torque wrench fastening head, etc., to control torque so as to apply a predetermined load to the piezoelectric element, and due to irregularities in mounting torque from the nut, irregularities in coefficients of friction and dimensions of an internal thread portion on the nut and an external thread portion cut into the tube portion, etc., preload acting on the piezoelectric element is not stable, and there have been problems such as irregularities in output characteristics and detecting precision arising during knocking detection.

For the purpose of solving problems such as those described above, the present inventors have proposed an invention, described in Japanese Patent Application No. 2004-301484, that is not yet commonly known.

In this configuration, a stopper ring inserted into the tube portion of the base is pressed down while using a pressing fitting to apply an external load axially, a punch is driven from beside the stopper ring with the sensor main body in a pressed state, and a protruding portion that is formed by driving the punch in is fixed by crimping into an annular groove that is formed on the tube portion in advance.

In a knock sensor configured as described above, the stopper ring is fixed into the annular groove of the tube portion by crimping, and the sensor main body is clamped by a flange portion on the base and the stopper ring, but the protruding portion of the plastically-deformed stopper ring may not be sufficiently press-fitted into the annular groove due to axial misalignment of the punch occurring due to irregularities in equipment, for example, thereby giving rise to irregularities in clamping force, making the preload imparted to the piezoelectric element become unstable, and there have been problems such as output characteristics and detecting precision becoming unstable, etc.

SUMMARY OF THE INVENTION

The present invention aims to solve the above-mentioned conventional problems and an object of the present invention is to provide a knock sensor in which output characteristics and detecting precision are stabilized, etc., by reducing irregularities in clamping force relative to a sensor main body to impart a stable preload to a piezoelectric element.

In order to achieve the above object, according to one aspect of the present invention, there is provided a knock sensor including: a base made up of: a flange portion; and a tube portion extending axially from the flange portion; a sensor main body including a piezoelectric element that is fitted over an outer peripheral portion of the tube portion; and a stopper ring that is fitted over the outer peripheral portion of the tube portion and cooperates with the flange portion to clamp the sensor main body, a groove extending circumferentially being formed on the outer peripheral surface of the tube portion, and the knock sensor being fixed by driving a pressing jig radially inward toward an outer peripheral surface of the stopper ring to plastically deform the stopper ring and press a protruding portion into the groove, wherein: an axial length of a recess portion that is formed simultaneously on the outer peripheral surface of the stopper ring when the protruding portion is formed is longer than an axial length of the groove.

In a knock sensor according to the present invention, output characteristics and detecting precision are stabilized by reducing irregularities in clamping force relative to the sensor main body to impart a stable preload to the piezoelectric element.

DETAILED DESCRIPTION OF THE PREFERRED EMBODIMENTS

Figure 1:
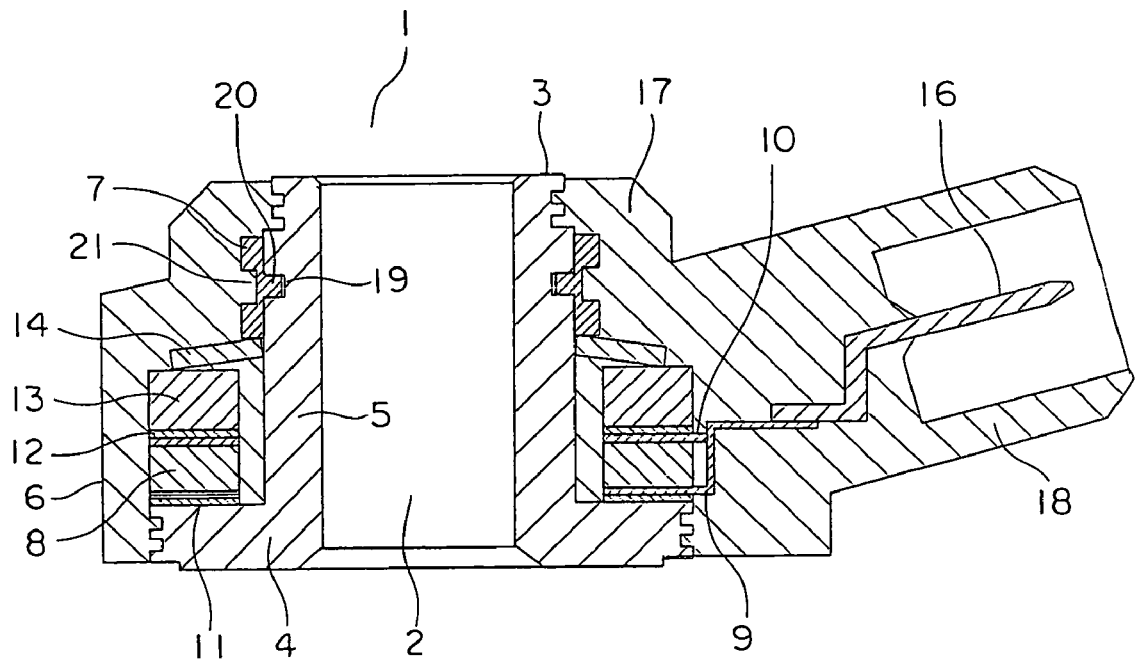
FIG. 1 is a cross section showing a knock sensor according to Embodiment 1 of the present invention.

Preferred embodiments of the present invention will now be explained based on drawings, and identical or corresponding members and portions in the drawings will be given identical numbering.

Embodiment 1

FIG. 1 is a cross section showing a knock sensor 1 in Embodiment 1 of the present invention.

In this knock sensor 1, a penetrating aperture 2 extending axially is formed in a central portion of a base 3. The base 3 is constituted by: a disk-shaped flange portion 4 formed on a lower end portion; and a tube portion 5 extending axially from the flange portion 4. A sensor main body 6 is fitted over an outer peripheral portion of the tube portion 5. In addition, a metal stopper ring 7 is fitted over the outer peripheral portion of the tube portion 5, and the sensor main body 6 is clamped by the stopper ring 7 and the flange portion 4.

In the sensor main body 6, a lower terminal plate 9 formed using a conductive metal plate comes into contact with a lower surface of an annular piezoelectric element 8 that outputs axial vibration propagating through the base 3 as a voltage signal. An upper terminal plate 10 formed using a conductive metal plate comes into contact with an upper surface of the piezoelectric element 8. An annular lower insulating sheet 11 is disposed between the lower terminal plate 9 and the flange portion 4. An annular upper insulating sheet 12 is disposed on the upper terminal plate 10.

In the sensor main body 6, an annular weight 13 for imparting vibrational force to the piezoelectric element 8 is disposed above the upper insulating sheet 12. A disk spring 14 is disposed between the weight 13 and the stopper ring 7. The disk spring 14 prevents sudden excessive pressing loads from acting on and damaging the piezoelectric element 8 when the stopper ring 7 is fitted over the tube portion 5, and facilitates generation of vibration in the weight 13 by knocking vibration from an internal-combustion engine.

The sensor main body 6 is constituted by the piezoelectric element 8, the lower terminal plate 9, the upper terminal plate 10, the lower insulating sheet 11, the upper insulating sheet 12, the weight 13, and the disk spring 14.

The lower terminal plate 9 and the upper terminal plate 10 of the sensor main body 6 are respectively connected by welding to a pair of terminals 16 of a connector.

The base 3, the sensor main body 6, and the stopper ring 7 are covered by a case 17 made of a synthetic resin ("NYLON 66" (registered trademark), for example). The case 17 is integrated with a case 18 of the connector. Moreover, the connector is electrically connected to an ignition timing control apparatus that is not shown.

Figure 2:
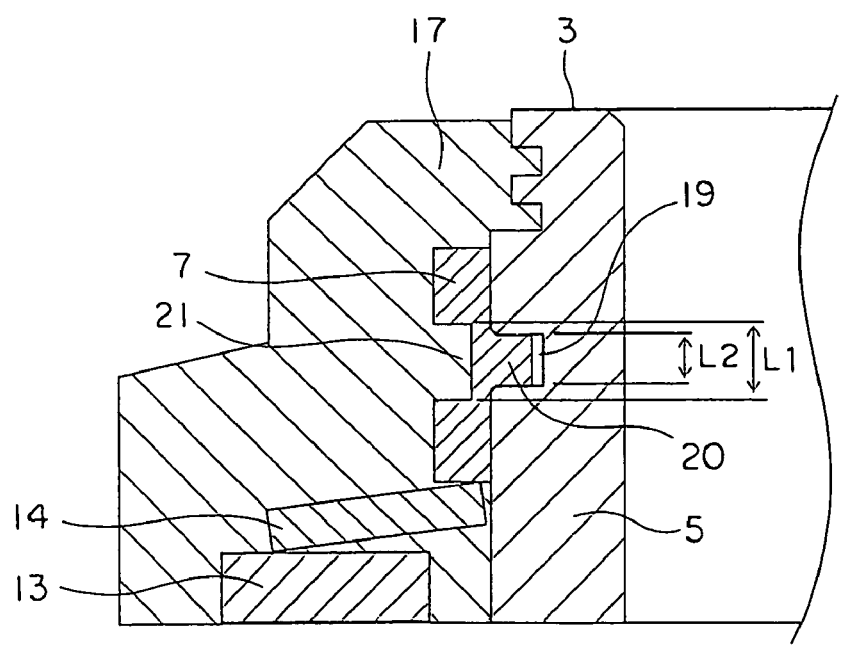
FIG. 2 is a partial enlargement of FIG. 1.

FIG. 2 is a partial enlargement of the knock sensor 1 in FIG. 1.

A groove 19 extending circumferentially is formed on an outer peripheral surface of the tube portion 5.

A protruding portion 20 of the plastically-deformed stopper ring 7 is pressed into the groove 19 by a pressing force acting radially inward from an outer peripheral surface of the stopper ring 7 to fix the stopper ring 7 to the tube portion 5 by crimping.

A recess portion 21 is formed in an outer peripheral surface of the stopper ring 7 opposite the protruding portion 20. An axial length L1 of the recess portion 21 is longer than an axial length L2 of the groove 19.

In this embodiment, L1 is 1.2 mm, and L2 is 1.0 mm.

Figure 3:
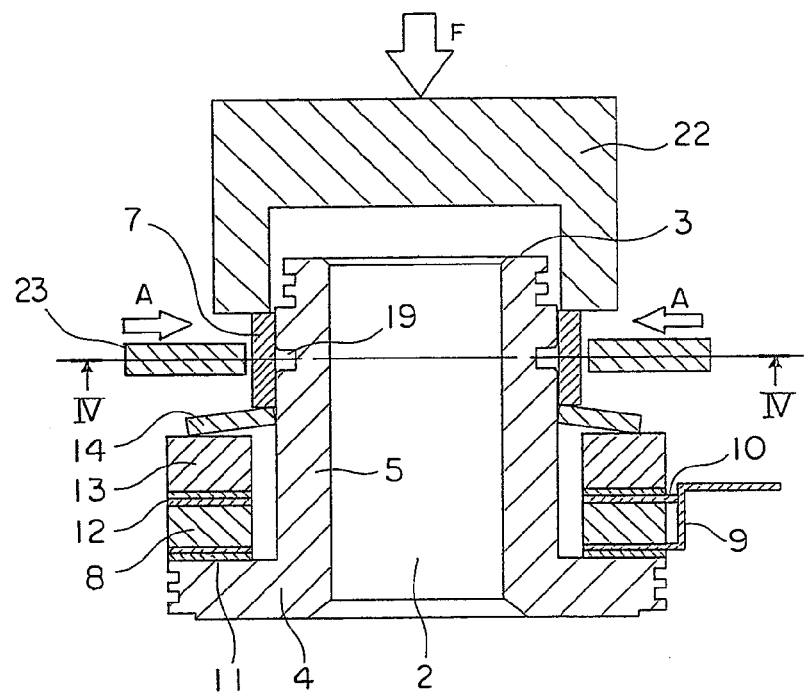
FIG. 3 is a cross section of the knock sensor in FIG. 1 partway through assembly.
Figure 4:
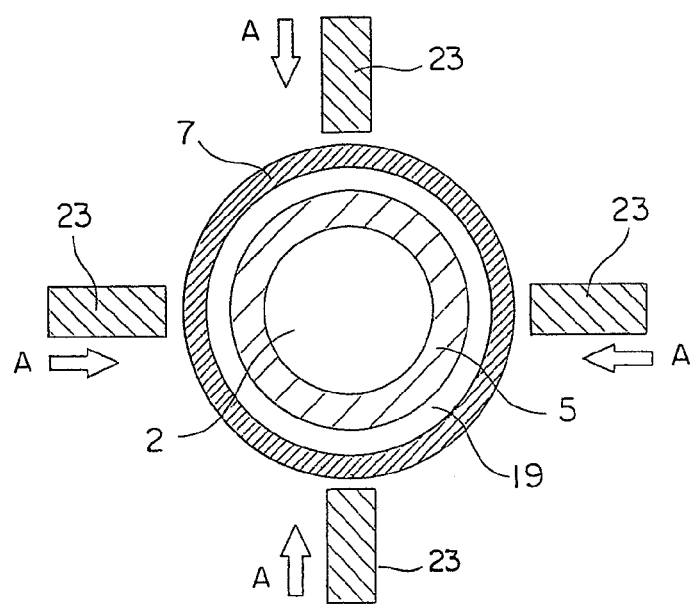
FIG. 4 is a cross section taken along line IV-IV in FIG. 3 viewed in the direction of the arrows.

Next, a procedure for manufacturing a knock sensor having the above configuration will be explained based on FIGS. 3 and 4.

First, the lower insulating sheet 11, the lower terminal plate 9, the piezoelectric element 8, the upper terminal plate 10, the upper insulating sheet 12, the weight 13, the disk spring 14, and the stopper ring 7 are fitted sequentially over the tube portion 5 of the base 3.

Thereafter, the stopper ring 7 is pressed down while applying an axial external load F on a pressing fitting 22 with a load indicator such as a load cell, etc., (not shown) interposed, and the pressing down action is stopped at a position where a predetermined load is reached. Then, the sensor main body 6 is clamped between the stopper ring 7 and the flange portion 4 at a predetermined preload by driving in punches 23 constituting a pressing jig from beside the stopper ring 7 in the direction of arrows A with the sensor main body 6 under pressure to fix the stopper ring 7 by crimping in the groove 19 of the tube portion 5 in four regions at a generally uniform pitch.

Finally, the respective terminals 16 are joined to the lower terminal plate 9 and the upper terminal plate 10 using soldering or resistance welding, and the case 17 is formed by coating the base 3 by resin molding except for an inner peripheral surface and two end surfaces of the tube portion 5. At that time, the connector case 18 for extracting signals is also simultaneously formed integrally on the case 17 by resin molding so as to project from a single side surface.

A knock sensor having the above configuration is mounted to an internal-combustion engine by a bolt that is inserted through the penetrating aperture 2 of the base 3. Then, if a knocking vibration occurs in the internal-combustion engine, the sensor main body 6 vibrates together with the knocking vibration, the vibration is converted into a voltage signal by the piezoelectric element 8, and the voltage signal is sent through the lower terminal plate 9, the upper terminal plate 10, and the terminals 16 to the ignition timing control apparatus as an output signal.

In a knock sensor according to Embodiment 1, because the axial length L1 of the recess portion 21 is longer than the axial length L2 of the groove 19, axial misalignment of the punches 23 arising due to irregularities in equipment, and irregularities in the axial alignment of the groove 19 on the tube portion 5, etc., can be absorbed.

Consequently, irregularities in clamping strength on the sensor main body 6 held and clamped between the stopper ring 7 and the flange portion 4 can be suppressed. Thus, the predetermined preload can be imparted to the piezoelectric element 8 accurately to stabilize output characteristics and detecting precision.

The diameter of the punches 23 is also increased compared to conventional knock sensors, enabling the volume of the protruding portion 20 that is press-fitted into the groove 19 and plastically deformed to be ensured by a small thrust (stroke) of the punches 23, thereby improving reliability in coupling the stopper ring 7 to the base 3. Service life of the punches 23 is also extended, thereby reducing manufacturing costs.

Embodiment 2

Figure 5:
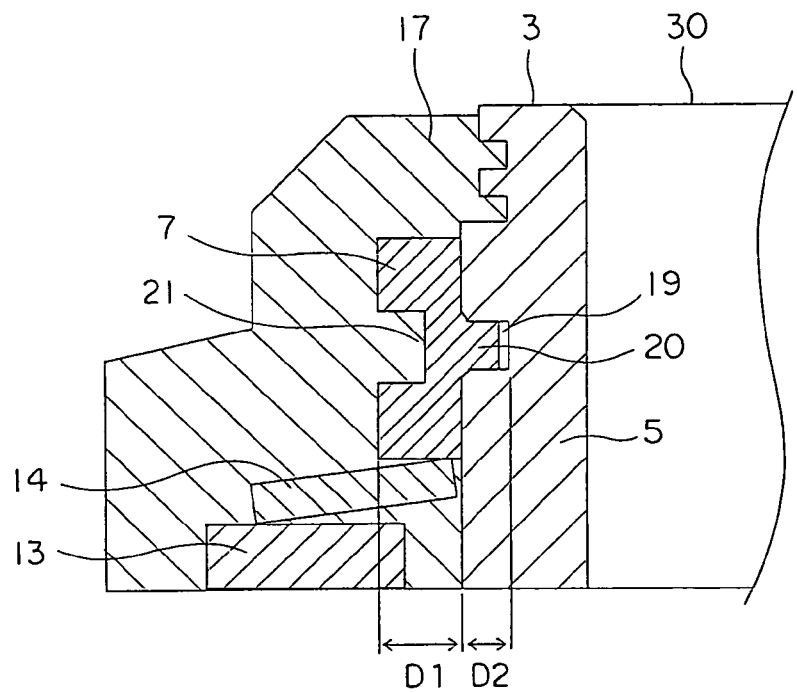
FIG. 5 is a partial cross section showing a knock sensor according to Embodiment 2 of the present invention.

FIG. 5 is a cross section showing a knock sensor 30 in Embodiment 2 of the present invention.

This embodiment is similar to Embodiment 1 except that a value of thickness D1 of a stopper ring 7 is greater than or equal to a value of depth D2 of a groove 19.

In a knock sensor according to Embodiment 2, because the value of the thickness D1 of the stopper ring 7 is greater than or equal to the value of the depth D2 of the groove 19, making the thickness D1 of the stopper ring 7 greater than that of Embodiment 1, the allowable buckling load of the stopper ring 7 is increased relative to the axial external load pressing on the sensor main body 6 through the pressing fitting 22. Consequently, buckling distortion of the stopper ring 7 is suppressed, reducing irregularities in clamping strength on the sensor main body 6.

Moreover, because plastic deformation characteristics of the stopper ring 7 become poor if the thickness of the stopper ring 7 is increased excessively, and the volume of the protruding portion 20 that is press-fitted into the groove 19 and plastically deformed cannot be ensured, it is desirable for the thickness D1 of the stopper ring to be within a range of one to two times the depth D2 of the groove 19.

Embodiment 3

Figure 6:
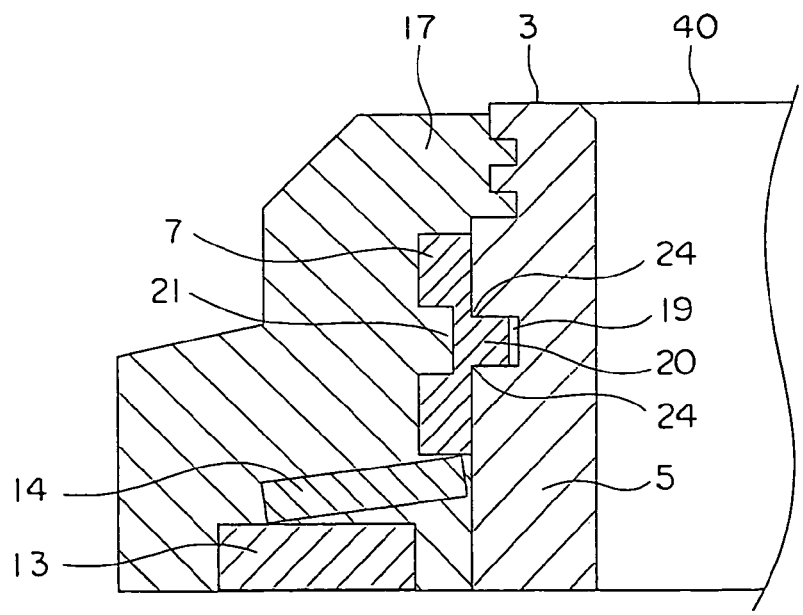
FIG. 6 is a partial cross section showing a knock sensor according to Embodiment 3 of the present invention.

FIG. 6 is a cross section showing a knock sensor 40 in Embodiment 3 of the present invention.

Whereas corner portions of the groove 19 are tapered in Embodiments 1 and 2, in this embodiment, corner portions 24 near an entrance to a groove 19 have a generally right-angled shape.

The rest of the configuration is similar to that of Embodiment 1.

In the knock sensor according to Embodiment 3, because the corner portions 24 near the entrance to the groove 19 have a generally right-angled shape, area of the groove 19 contributing to clamping relative to the sensor main body 6 is increased compared to Embodiments 1 and 2, in which the corner portions are tapered, thereby increasing clamping strength and improving reliability in coupling the stopper ring 7 to the base 3.

However, a large portion of chips arising when the groove 19 is formed accumulate on the corner portions 24, and if left in this state, it is possible that the chips may enter between the electrodes of the piezoelectric element 8 and short-circuit the electrodes.

In order to prevent that situation, chips that have accumulated on the corner portions 24 must be removed by applying easing to the corner portions 24. For this reason, it is necessary to apply a minimum easing in which R is less than or equal to 0.3 or C is less than or equal to 0.3 to the corner portions 24.

Embodiment 4

Figure 7:
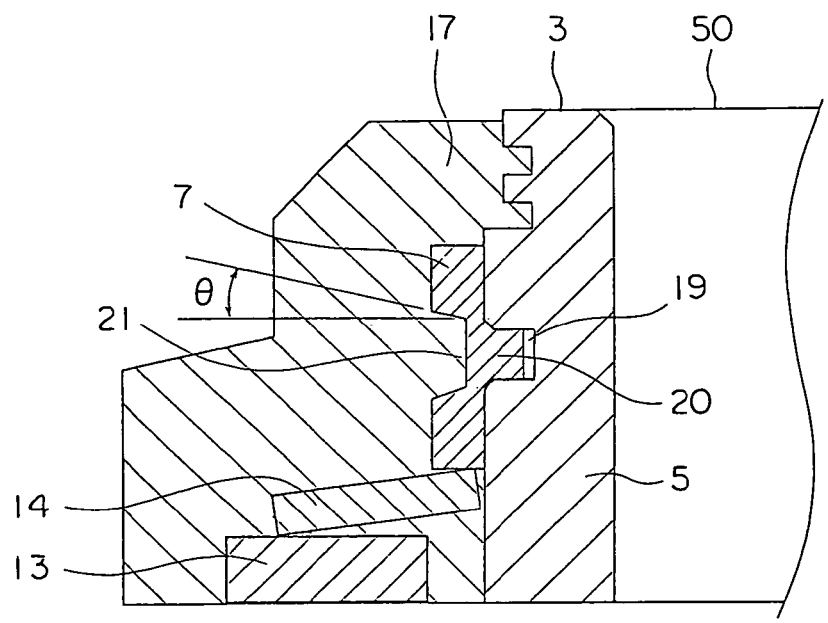
FIG. 7 is a partial cross section showing a knock sensor according to Embodiment 4 of the present invention.

FIG. 7 is a cross section showing a knock sensor 50 in Embodiment 4 of the present invention.

In this embodiment, a recess portion 21 formed on a stopper ring 7 has a shape that enlarges toward an open end.

The rest of the configuration is similar to that of Embodiment 1.

Figure 8:
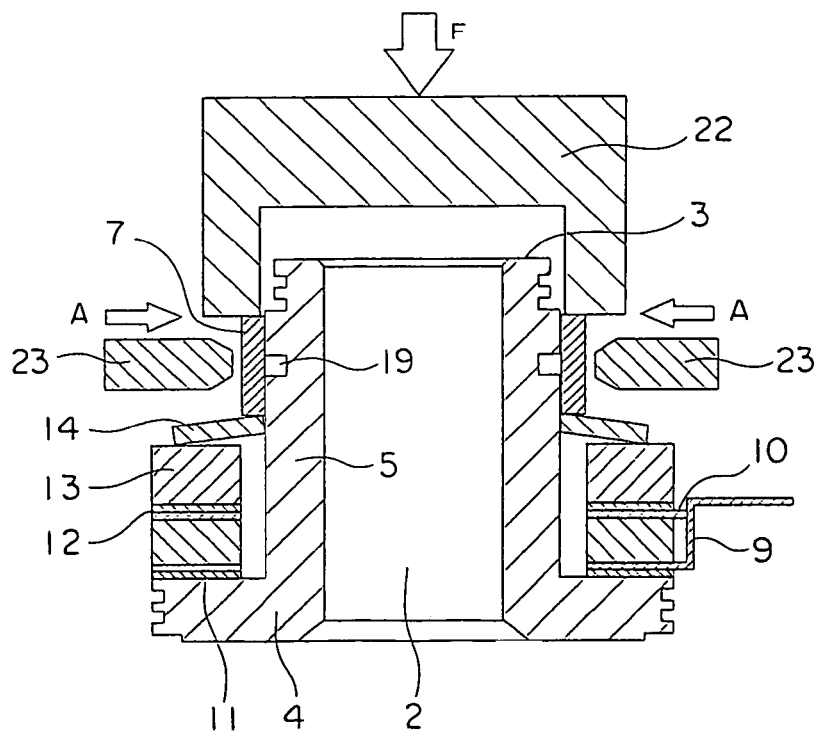
FIG. 8 is a cross section of the knock sensor in FIG. 7 partway through assembly.

In this embodiment, as shown in FIG. 8, leading end portions of the punches 23 have a tapered shape, and the punches 23 are driven in from beside the stopper ring 7 in the direction of arrows A with the sensor main body 6 pressed by the pressing fitting 22 to fix the stopper ring 7 by crimping in the groove 19 of the tube portion 5 in four regions at a generally uniform pitch.

In a knock sensor 50 according to Embodiment 4, because the leading end portions of the punches 23 have a tapered shape, frictional force arising between the stopper ring 7 and the punches 23 as the punches 23 are being driven into and pulled out of the stopper ring 7 can be reduced, enabling the driving in and pulling out actions of the punches 23 to be made smoother.

Because frictional force as the punches 23 are being driven into the stopper ring 7 decreases, service life of the punches 23 is also extended.

Moreover, if a taper angle θ of the recess portion 21 is too large, frictional force as the punches 23 are being driven into the stopper ring 7 increases, and the amount of plastic deformation of the protruding portion 20 of the stopper ring 7 decreases, reducing reliability in coupling the stopper ring 7 to the base 3. Consequently, it is desirable for the taper angle θ to be a maximum of 45 degrees.

What is claimed is:

1. A knock sensor comprising:
  a base made up of:
  a flange portion; and
  a tube portion extending axially from said flange portion;
  a sensor main body including a piezoelectric element that is fitted over an outer peripheral portion of said tube portion; and
  a stopper ring that is fitted over said outer peripheral portion of said tube portion and cooperates with said flange portion to clamp said sensor main body,
  a groove extending circumferentially being formed on said outer peripheral surface of said tube portion, and said knock sensor being fixed by driving a pressing jig radially inward toward an outer peripheral surface of said stopper ring to plastically deform said stopper ring and press a protruding portion of said stopper ring into said groove,
  wherein:
  an axial length of a recess portion, recessed from said outer peripheral surface of said stopper ring by said pressing jig, is greater than an axial length of said groove, and
  wherein said recess portion forms a hole within said stopper ring.

2. The knock sensor according to claim 1, further comprising an annular weight disposed above said piezoelectric element and a disk spring disposed between said annular weight and said stopper ring.

3. A knock sensor comprising:
  a base made up of:
  a flange portion; and
  a tube portion extending axially from said flange portion;
  a sensor main body including a piezoelectric element that is fitted over an outer peripheral portion of said tube portion; and
  a stopper ring that is fitted over said outer peripheral portion of said tube portion and cooperates with said flange portion to clamp said sensor main body,
  a groove extending circumferentially being formed on said outer peripheral surface of said tube portion, and said knock sensor being fixed by driving a pressing jig radially inward toward an outer peripheral surface of said stopper ring to plastically deform said stopper ring and press a protruding portion of said stopper ring into said groove,
  wherein:
  an axial length of a recess portion, recessed from said outer peripheral surface of said stopper ring, is greater than an axial length of said groove,
  wherein said recess portion forms a hole within said stopper ring, and
  wherein:
    a relationship between a thickness D1 of said stopper ring and a depth D2 of said groove satisfies a relationship $D2 \leq D1 \leq 2D2$.

4. A knock sensor comprising:
  a base made up of:
  a flange portion; and
  a tube portion extending axially from said flange portion;
  a sensor main body including a piezoelectric element that is fitted over an outer peripheral portion of said tube portion; and
  a stopper ring that is fitted over said outer peripheral portion of said tube portion and cooperates with said flange portion to clamp said sensor main body,
  a groove extending circumferentially being formed on said outer peripheral surface of said tube portion, and said knock sensor being fixed by driving a pressing jig radially inward toward an outer peripheral surface of said stopper ring to plastically deform said stopper ring and press a protruding portion of said stopper ring into said groove,
  wherein:
  an axial length of a recess portion, recessed from said outer peripheral surface of said stopper ring, is greater than an axial length of said groove,
  wherein said recess portion forms a hole within said stopper ring, and
  wherein:
    an easing process in which a chamfer C is less than or equal to 0.3 or a radius R is less than or equal to 0.3 is applied to a corner portion of said tube portion near an entrance to said groove.

5. A knock sensor comprising:
  a base made up of:
  a flange portion; and a tube portion extending axially from said flange portion;

a sensor main body including a piezoelectric element that is fitted over an outer peripheral portion of said tube portion; and a stopper ring that is fitted over said outer peripheral portion of said tube portion and cooperates with said flange portion to clamp said sensor main body, a groove extending circumferentially being formed on said outer peripheral surface of said tube portion, and said knock sensor being fixed by driving a pressing jig radially inward toward an outer peripheral surface of said stopper ring to plastically deform said stopper ring and press a protruding portion of said stopper ring into said groove, wherein:

an axial length of a recess portion, recessed from said outer peripheral surface of said stopper ring, is greater than an axial length of said groove, wherein said recess portion forms a hole within said stopper ring, and wherein:

said recess portion tapers from said outer peripheral surface of said stopper ring to an inner surface of said recess portion.

* * * * *